United States Patent [19]

Murakami et al.

[11] Patent Number: 5,466,896
[45] Date of Patent: Nov. 14, 1995

[54] POSITION DETECTOR

[76] Inventors: Azuma Murakami, c/o Wacom Co. Sakurada 5-chrome, Washinomiya-sho; Tsuguya Yamanami; Takahiko Funahashi, both of c/o Wacom Co., Ltd. Sakurada 5-chome, Washinomiya-cho, all of Kitakatsushika-gun, Saitama 340-02, Japan

[21] Appl. No.: 849,414

[22] PCT Filed: Oct. 31, 1990

[86] PCT No.: PCT/JP90/01397

§ 371 Date: Apr. 29, 1992

§ 102(e) Date: Apr. 29, 1992

[87] PCT Pub. No.: WO91/6907

PCT Pub. Date: May 16, 1991

[30] Foreign Application Priority Data

Nov. 1, 1989 [JP] Japan ................................ 1-282852

[51] Int. Cl.⁶ ............................................. G08C 21/00
[52] U.S. Cl. ................................................. 178/19
[58] Field of Search ............... 178/18, 19; 345/179, 345/156; 382/3

[56] References Cited

U.S. PATENT DOCUMENTS

| | | | |
|---|---|---|---|
| 4,479,032 | 10/1984 | Parnell | 178/19 |
| 4,644,102 | 2/1987 | Blesser et al. | 178/19 |
| 4,646,351 | 2/1987 | Asbo et al. | 178/19 X |
| 4,672,154 | 6/1987 | Rodgers et al. | 178/19 |
| 4,818,826 | 4/1989 | Kimura et al. | 178/19 |
| 5,023,408 | 6/1991 | Murakami et al. | 178/19 |
| 5,028,745 | 6/1991 | Yamanami et al. | 178/19 |

Primary Examiner—Stephen Chin
Assistant Examiner—Paul Loomis
Attorney, Agent, or Firm—Lowe, Price, LeBlanc & Becker

[57] ABSTRACT

An electromagnetic detector having plural loop coils arranged in parallel with one another in a position detecting direction determines a position coordinate value designated by a position indicator having at least a coil. One loop coil in each of plural groups is selected simultaneously from plural loop coils of the group so not less than a predetermined number of the relative positions of these selected loop coils are not the same or are a symmetric in each group and over a plurality of groups. A loop coil on which the position indicator is positioned is determined in response to a signal amplitude pattern obtained by the loop coil selection. This makes it unnecessary to select all loop coils at the time of starting a position detecting operation, to reduce the time required to determine the coordinate value. When the coordinate value is determined, digital data corresponding to an arbitrary AC signal are converted into an analog signal, and a reception signal sampled at a predetermined cycle to convert the AC signal into digital data. These digital data are subjected to predetermined computation to calculate amplitude and phase angle with respect to an arbitrary frequency component in the reception signal, whereby the concurrent use of a plurality of coordinate indicators is effected easily.

16 Claims, 15 Drawing Sheets

5,466,896

POSITION DETECTOR

FIELD OF THE INVENTION

This invention relates to a position detector which can shorten the time required to initially determine the position of a position indicator and which facilitates the simultaneous use of multiple position indicators, in determining the coordinate values of the position specified by the position indicator(s).

BACKGROUND OF THE INVENTION

Prior to this application, the applicant submitted a proposal for a position detector to determine the coordinate values of the position specified by the corresponding position indicator through transmission/reception of electromagnetic waves between a sensing unit and the position indicator under U.S. Pat. No. 5,028,745 (hereinafter referred to as the prior application).

The contents of the prior application will be briefly explained below. First, an electromagnetic wave is generated by applying an AC signal to a loop coil in the sensing unit consisting of multiple loop coils juxtaposed in the direction of position detection. The tuning circuit incorporated in the position indicator is driven by this electromagnetic wave. At this time, an electromagnetic wave emitted from the tuning circuit is received by the said loop coil to generate an induced voltage. This is repeated on multiple loop coils in sequence. The amplitude and phase angle of the induced voltage generated at each loop coil or the received signal are detected. With these values, the coordinate value of the specified position is determined.

However, in the above device, at least, all loop coils must be switched to determine the initial position of the position indicator. This requires considerable detection time. In particular, a large sensing unit is required. That is, the device has the disadvantage of requiring more time as the number of loop coils increases.

To detect the amplitude and phase angle of the signal corresponding to the AC signal actually applied to a loop coil from among received signals, the above device uses a ceramic filter which allows only the frequency component corresponding to the frequency of the AC signal to pass. Therefore, if two or more AC signals of different frequencies are used, ceramic filters corresponding to each frequency must be provided. Thus, the device has the disadvantage that it is difficult to simultaneously use multiple position indicators to increase the number of AC signal frequencies.

Additionally, the transient response characteristics of the above ceramic filter are so poor that transmission/reception of electromagnetic waves must be repeated several times for each loop coil to receive a stable output signal. Thus, the device has the disadvantage that the loop coil switching speed cannot be increased because it takes considerable time to select a loop coil.

Furthermore, the said ceramic filter includes a mechanical vibrator, is of a specific size, and requires many analog switches for individual loop coils for loop coil switching. Thus, the device has the disadvantage that component installation area and height cannot be reduced and it is difficult to design the device in IC form.

DISCLOSURE OF THE INVENTION

The primary objective of the present invention is to shorten the time required to initially determine the position of the position indicator.

To achieve the primary objective of the invention, the position detector to determine the coordinate values of the position specified by a position indicator using electromagnetic effect between a sensing unit consisting of multiple loop coils juxtaposed in the direction of position detection, and the position indicator having at least one coil comprising a selection means for selecting a loop coil from each of the multiple groups including the above multiple loop coils juxtaposed in series whereby the relative positions of selected coils are not identical or symmetrical in each Group or between groups except those within a predetermined limit, and an identifying means for identifying the loop coil on which the position indicator is located among the multiple loop coils according to the pattern of the signal amplitude obtained by the above loop coil selection.

By the invention, because the positions of the loop coils simultaneously selected by the selection means are not identical or symmetrical in each group and between Groups except those within a predetermined limit, the pattern of the signal amplitude obtained by the position of the position indicator differs and the loop coil on which the position indicator is located is identified by the identifying means according to this pattern. Consequently, selection of all loop coils is not necessary at the start of detection unlike previously, and the time required to initially determine the coordinate value of the position specified by the position indicator can be greatly shortened.

The second objective of the present invention is to permit the simultaneous use of multiple position indicators, freely setting the frequency, phase and amplitude of the AC signal to be used, without the necessity of changing hardware.

To achieve this, a position detector to determine the coordinate value of the position specified by a position indicator using electromagnetic effect between a sensing unit consisting of multiple loop coils juxtaposed in the direction of position detection and a position indicator having at least one coil possesses a data generating means for generating digital data corresponding to any AC signal, a digital-analog conversion means for converting this digital data into an analog signal, an analog-digital conversion means for converting a received signal into digital data sampling it within a predetermined period, and an arithmetic means for calculating the amplitude and phase angle for an optional frequency component in a received signal by performing a predetermined arithmetic operation for the digital data.

By the invention, the digital data generated by the data generating means is sent to the analog conversion means where it is converted into an ordinary analog AC signal. The frequency, phase and amplitude of this AC signal can be freely set using the digital data sent to the analog conversion means from the memory means. The received signal is converted into digital data by the analog-digital conversion means and an arithmetic operation based on the digital data is performed by the arithmetic means to calculate the amplitude and phase angle for an optional frequency component in the received signal. Accordingly, electromagnetic waves of any frequency, phase and amplitude can be generated and the amplitude and phase angle for an optional frequency component can be detected. Also, multiple position indicators having a tuning circuit of a different tuning frequency or position indicators with multiple turning circuits of different turning frequencies can be used simultaneously and their positions can be detected immediately.

Also, the third objective of the present invention is to increase the loop coil switching speed and reduce the component installation area and height, or to make possible IC-format design, lower power consumption and cost reduction.

To achieve the third objective of the invention, a configuration is provided which requires no ceramic filter for the said position transducer. With this, it is sufficient to perform transmission/reception of electromagnetic waves only once for a loop coil, with the result that switching speed can be greatly improved and the number of analog switches can be reduced. Because multiple oscillators are not required, the component installation area and height can be reduced and the whole device can be designed in IC format except the sensing unit. Consequently, a small, low-power-consumption and low-cost device can be realized.

Other objects, constituents and effects than the above will be clarified in the following explanation.

EMBODIMENT OF THE INVENTION

Figure 1:
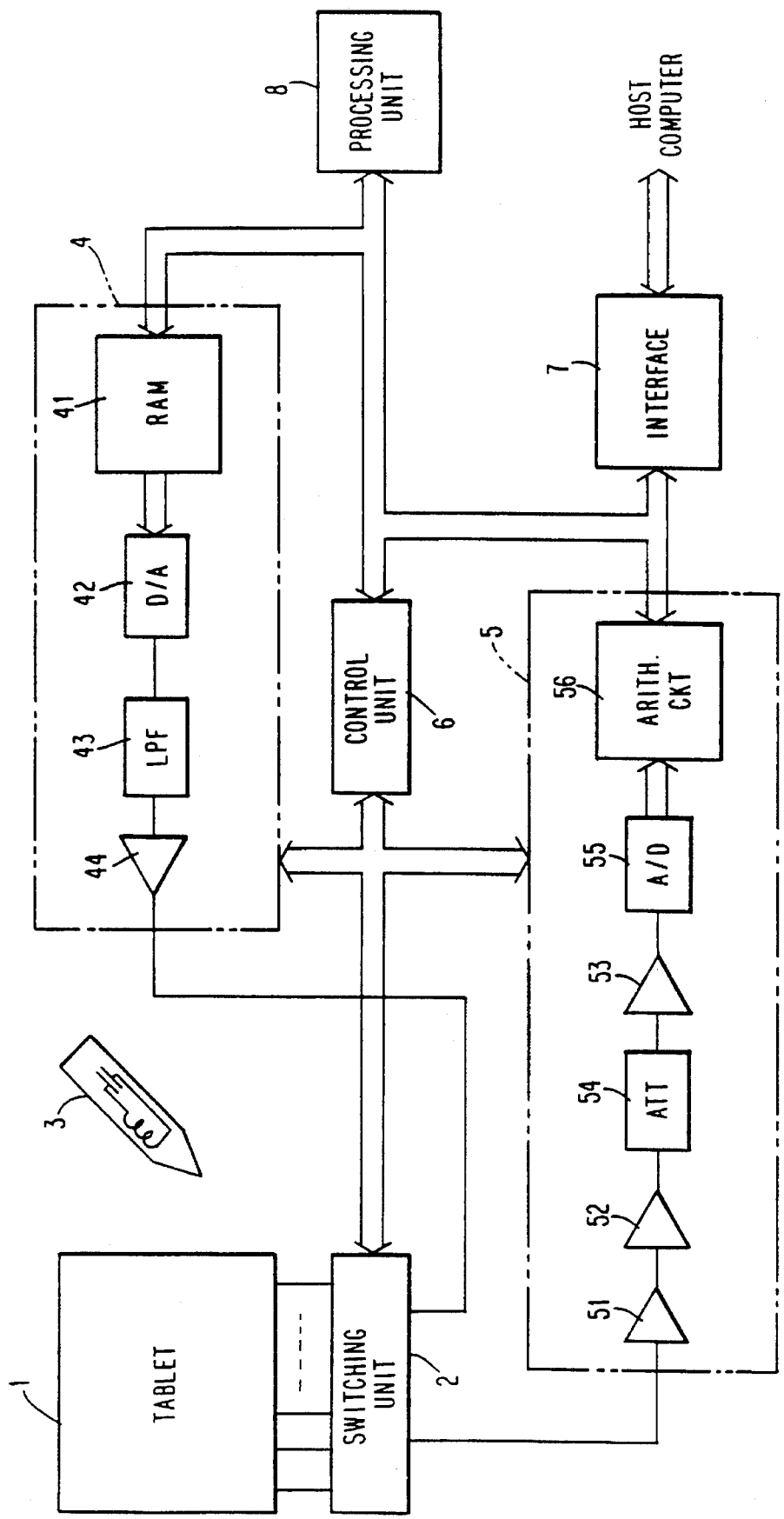
FIG. 1 is a block diagram of a preferred embodiment of a position detector according to the present invention.

FIG. 1 is a block diagram of an example of the position detector of the present invention in operation. FIG. 1 includes sensing unit 1, switching unit 2, position indicator 3, signal generating unit 4 including a digital synthesis, signal detecting unit 5, control unit 6, interface unit 7, and processing unit 8.

Figure 2:
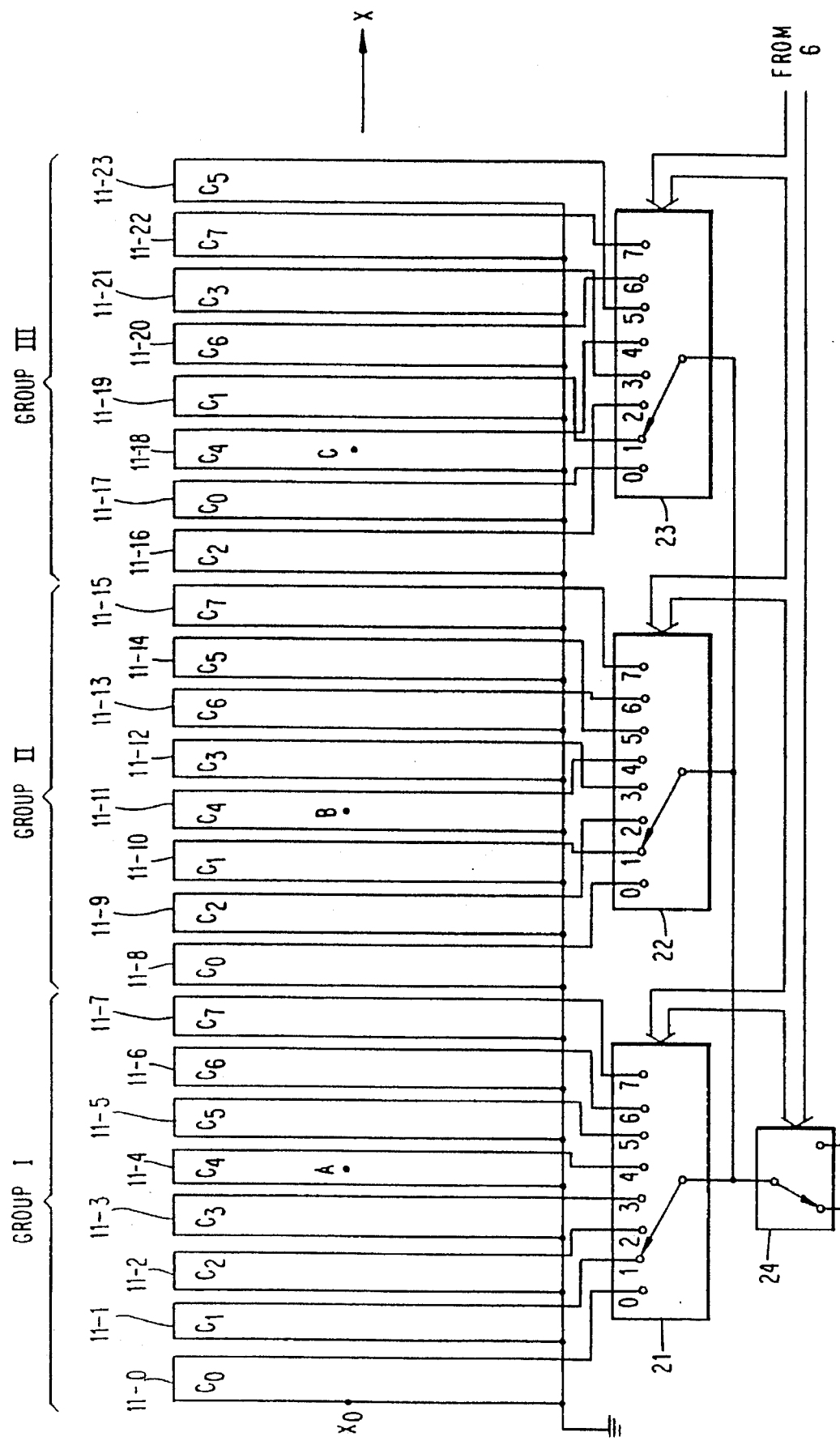
FIG. 2 is a circuit diagram of a detailed configuration of the sensing unit and switching unit.

FIG. 2, a circuit diagram of details of sensing unit 1 and switching unit 2, includes loop coils 11-0 to 11-23 of unit 1 and analog switches 21, 22, 23 and 24 of unit 2.

Individual loop coils-11-0 to 11-23 are roughly rectangular and juxtaposed in such a way that the longer sides extend orthogonally to the direction of position detection, for example the longer sides of the coils are at right angles to the X-direction. Loop coils 11-0 to 11-23 are arranged in three groups I, II and III, each including 8 juxtaposed loop coils. That is, group I consists of loop coils 11-0 to 11-7, group II consists of loop coils 11-8 to 11-15, and group III consists of loop coils 11-16 to 11-23. One end of each individual loop coil in groups I, II and III is respectively connected to the 8 selection terminals of analog switches 21, 22 and 23, and the other ends of the 24 loop coils have a common ground. Switching terminals of analog switches 21, 22 and 23 have a common connection to a switching terminal of analog switch 24. The two selection terminals of analog switch 24 are connected to signal generating unit 4 and signal detecting unit 5 respectively. Analog switches 21 to 24 are designed in such a way that the switching terminals are connected to a selection terminal according to the information sent from control unit 6. The number of loop coils and the number of groups in above complete sensing unit 1 and the number of loop coils in each group are only provided as an example and are not limited to the stated values. The number of loop coils in each group is not necessarily equal.

Here, loop coils 11-0 to 11-7 of group I are connected to the selection terminals of analog switch 21 in the order of terminal numbers, namely, "0, 1, 2, 3, 4, 5, 6, 7". However, loop coils 11-8 to 11-15 of group II are connected to the selection terminals of analog switch 22 in the order of terminal numbers "0, 2, 1, 4, 3, 6, 5, 7" and loop coils 11-16 to 11-23 of group III are connected to the selection terminals of analog switch 23 in the order of terminal numbers "2, 0, 4, 1, 6, 3, 7, 5". Such an arrangement prevents the relative positions of the loop coils that are simultaneously selected by analog switches 21, 22 and 23 from being identical or symmetrical in each group and between groups except those within a predetermined limit, or up to 3 loop coils in this case. That is, supposing that the loop coils connected to selection terminal numbers "0, 1, 2, 3, 4, 5, 6, 7" of each analog switch are "$C_0$, $C_1$, $C^2$, $C_3$, $C_4$, $C_5$, $C_6$, $C_7$", the relative position (array) for example, of "$C_0$, $C_1$, $C_2$, $C_3$" does not exist in the other groups or between two groups and the array of "$C_3$, $C_2$, $C_1$, $C_0$" does not exist, either.

Figure 3:
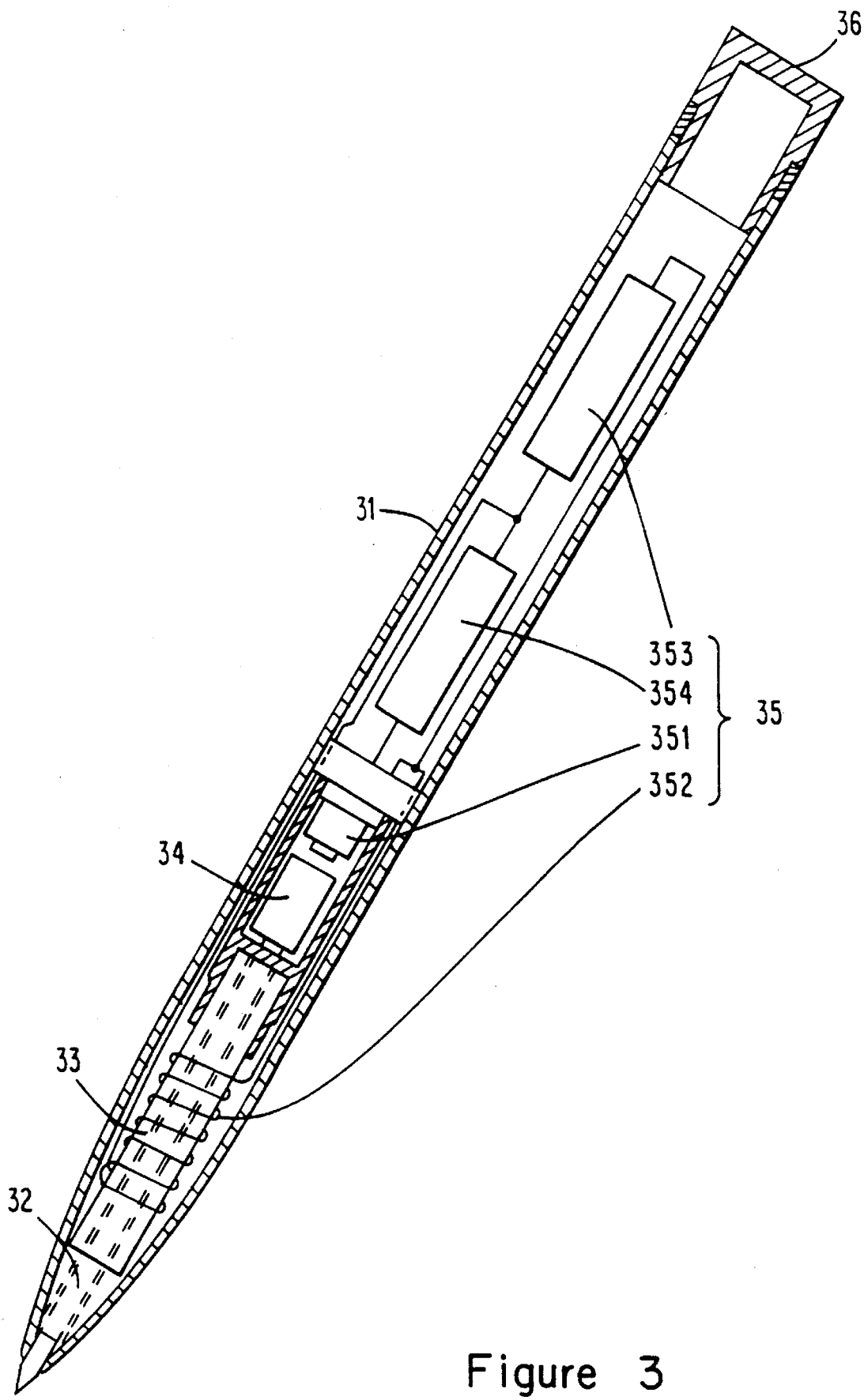
FIG. 3 is a sectional view of the input pen.

Position indicator 3 (hereinafter referred to as the input pen) contains a ball pen tip 32, a ferrite core 33 featuring a through hole to freely allow tip 32 to be slid in, a coil spring 34, and a tuning circuit 35 including switch 351, a coil 352 wound around ferrite core 33 and capacitors 353 and 354 combined in a unit in a case 31 made of nonmetallic material such as resign from its front end in this order, as shown in FIG. 3. A cap 36 is provided at its rear end.

Coil 352 and capacitor 353 are mutually connected in series to provide a standard resonance circuit configuration. The values of coil 352 and capacitor 353 are set at the values where the predetermined frequency f0 is a resonance (tuning) frequency for AC energy applied to coils 11-0 through 11-23. Capacitor 354 is connected in parallel across capacitor 353 through switch 351, and acts to reduce (lower) the resonance frequency f0 when switch 351 is turned on. By pushing the end of tip 32 against an input surface (not shown in the figure) of sensing unit 1 while case 31 is held by hand so that the tip is inserted into the case 31, switch 351 is pushed from the rear through coil spring 34, and is thereby turned on.

Signal generating unit 4, including a random access memory (RAM) 41, a digital-analog converter (DA converter) 42, a low pass-filter (LPF) 43 and a driving amplifier 44, generates AC signals with selected frequency, phase and amplitude. Ram 41 and converter 42 comprise the digital synthesizer.

Figure 4:
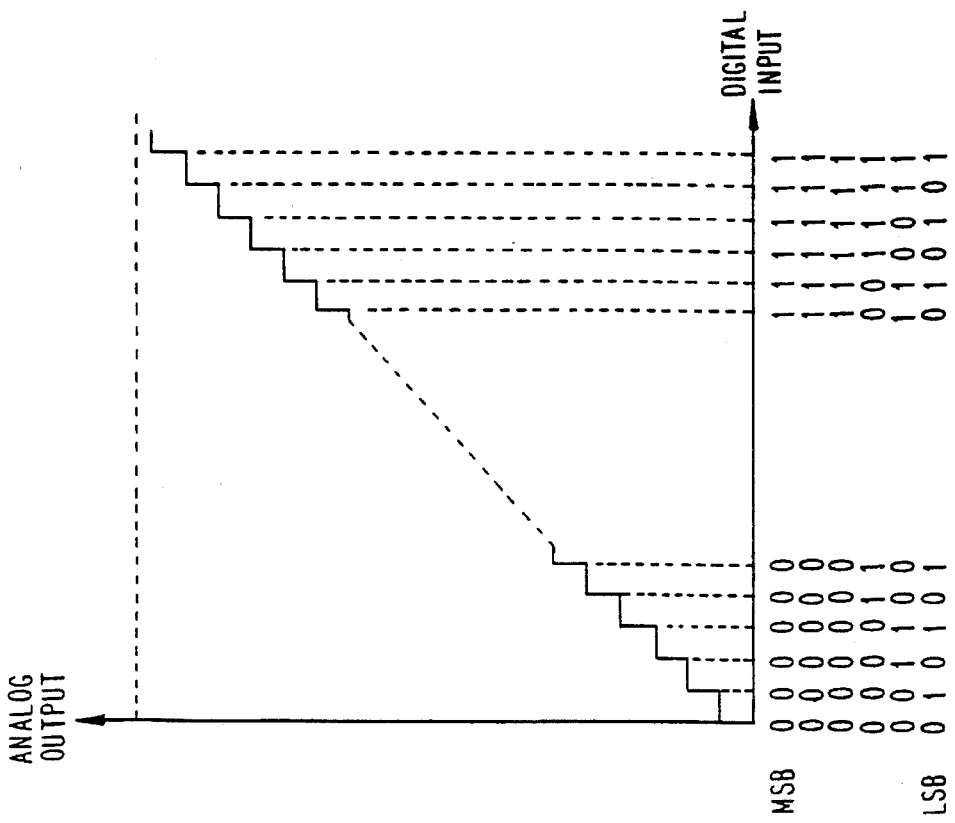
FIG. 4 is an explanatory drawing of the conversion characteristics of DA converter of FIG. 1.

RAM 41 stores the data corresponding to an AC signal to be generated out of multiple-bit data, or 6-bit digital data in this case, corresponding to the optional signals previously prepared in processing unit 8 or a host computer. DA converter 42 converts the digital data read out from RAM 41 into analog pulse (PAM) signals in sequence. FIG. 4 is an illustration of conversion characteristics in DA converter 42. Low pass filter 43 removes a high-frequency component from the above PAM signal and outputs only its envelope component. Driving amplifier 44 amplifies the above envelope component to a proper level and outputs it as a target AC signal. Data writing and data reading in above RAM 41 and conversion in DA converter 42 are executed according to the information from control unit 6. A read-only memory storing the digital data corresponding to at least one AC signal may be used in place of RAM 41. If a high-speed CPU is used for processing unit 8, a bus buffer may be used.

Signal detecting unit 5, including preamplifier 51, amplifiers 52 and 53, an attenuator (ATT) 54, an analog-digital converter (AD converter) 55 and an arithmetic circuit 56, detects the amplitude and phase angle for the selected frequency component in a received signal.

Figure 5:
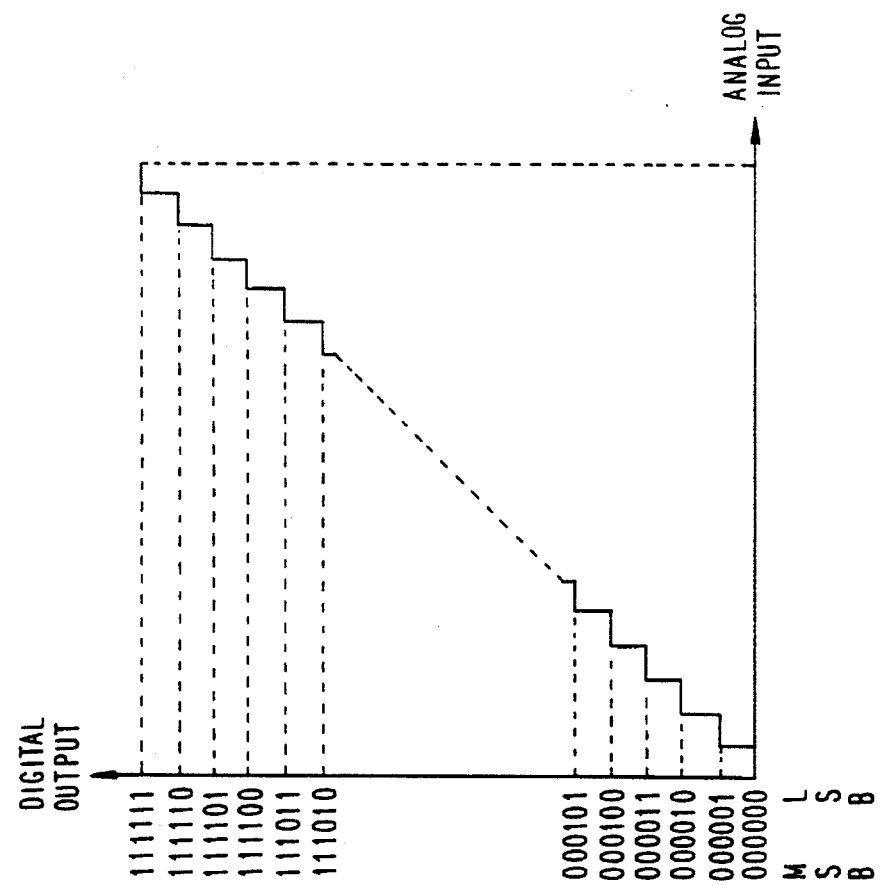
FIG. 5 is an explanatory drawing of the conversion characteristics of the AD converter of FIG. 1.

Preamplifier 51, amplifiers 52 and 53 and attenuator 54 amplify a received signal to a proper level. AD converter 55 samples the amplified received signal within a predetermined period, e.g. 250 nsec, and converts it into 6-bit digital data. FIG. 5 is an illustration of conversion characteristics of AD converter 55. Arithmetic circuit 56 performs a predetermined arithmetic operation, for example, a discrete Fourier transform operation described later, by using the above digital data to calculate the amplitude and phase angle for an optional frequency component. The attenuation adjustment of attenuator 54, the conversion in the AD converter 55 and the calculation in arithmetic circuit 56 are executed according to the information from control unit 6.

Control unit 6 operates on the basis of instructions from processing unit 8 to control the timing of each unit according to the preset sequence. To reduce power consumption, signal detecting unit 5 enters a standby state when an electromagnetic wave is generated (transmitted) and signal generating unit 4 enters a standby state when an electromagnetic wave is received. If no received signal is obtained after a certain time has elapsed, or if no position indicator is detected, both signal generating unit 4 and signal detecting unit 5 enter a standby state.

Interface unit 7 undertakes data exchange with the host computer and includes at least two registers directly connected to the bus line of the host computer. The register is of FIFO memory structure. The host computer reads out data according to a determined data format by accessing this register several times.

Processing unit 8 calculates the coordinate values of a specified position, performs data transmission with the host computer, and exerts overall unit control. Unit 8 includes a well-known microprocessor, ROM and RAM storing necessary programs and data, etc.

Figure 6:
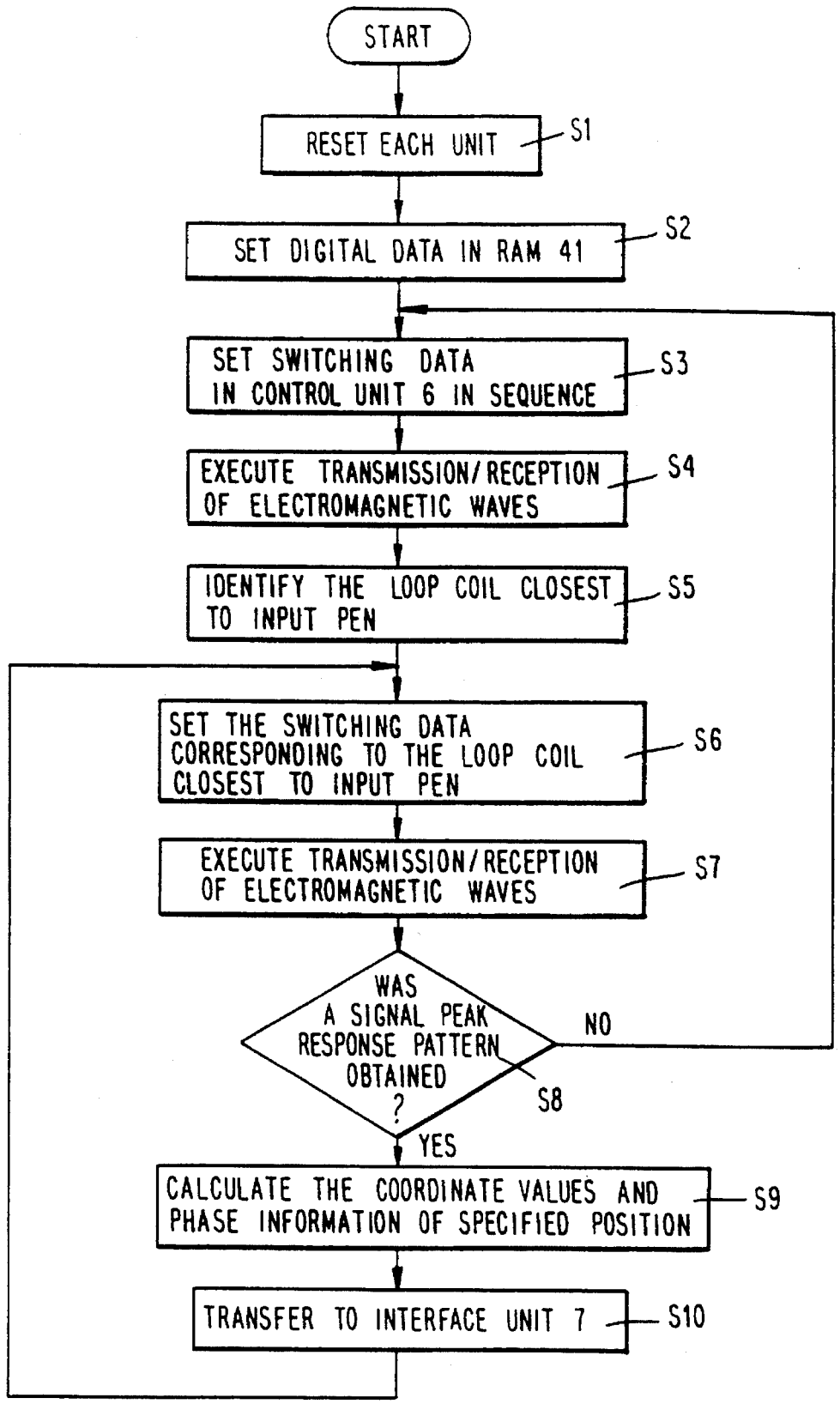
FIG. 6 is a flowchart of processing in the processing unit of FIG. 1.

FIG. 6 is a flowchart of processing in processing unit 8. In the following, the operations of this device will be explained according to this flowchart.

First, processing unit 8 resets each unit (S1) and writes the digital data corresponding to a sine wave of frequency f0 previously prepared in RAM 41 of signal generating unit 4 or of 500 kHz in this case (S2). More precisely, the processing unit writes 128 6-bit digital data representing a 500 kHz 16-wave sine wave that can be output within a predetermined transmission period or 32 μsec in this case. Next, processing unit 8 writes switching data into control unit 6 to switch analog switches 21 to 23 in the order of terminals numbers "0, 1, 2, 3, 4, 5, 6, 7" (S3), and causes control unit 6 to perform transmission/reception of electromagnetic waves (S4).

Figure 7:
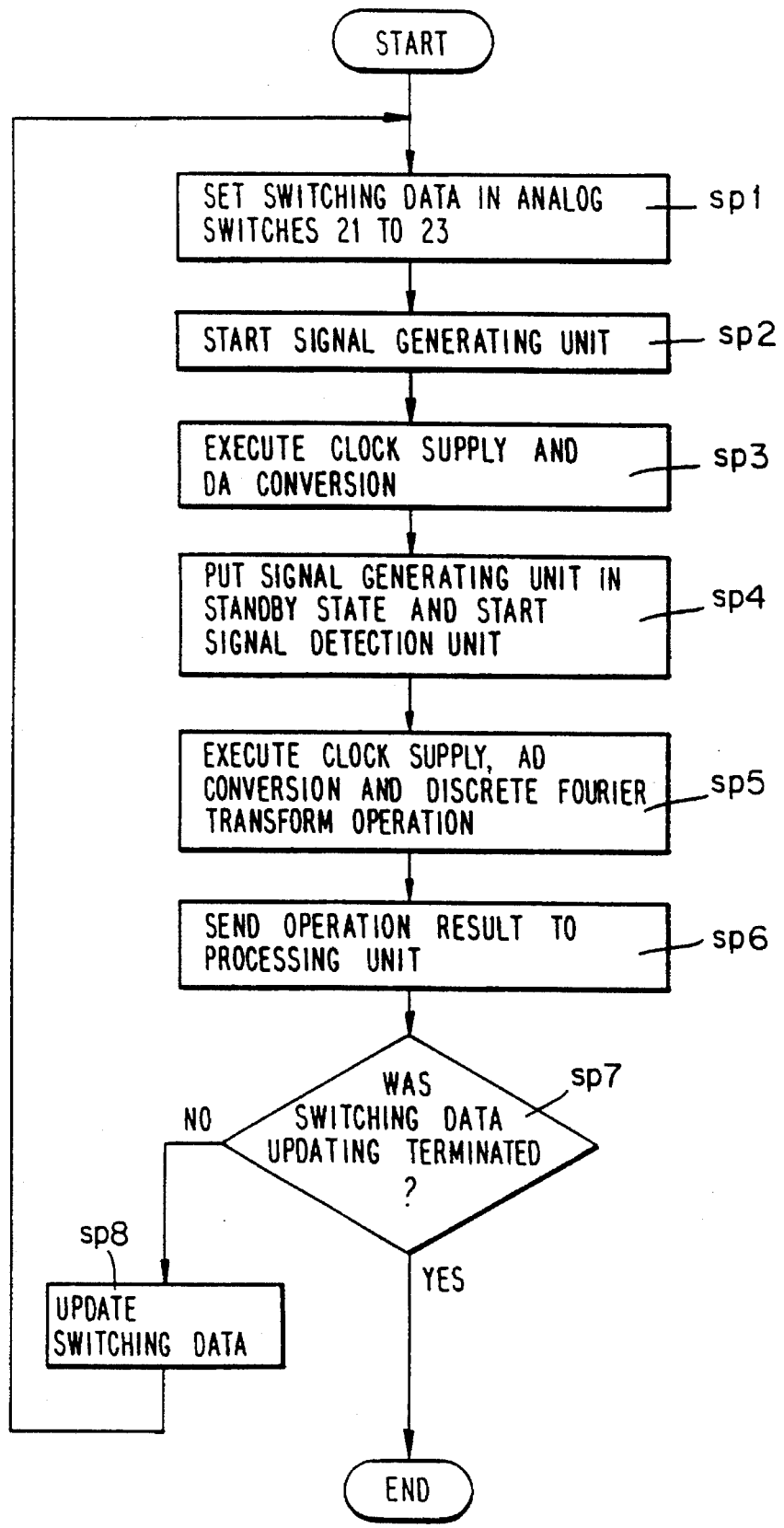
FIG. 7 is a flowchart of processing in the control unit of FIG. 1.

FIG. 7 is a flowchart of processing in control unit 6 concerned with the transmission/reception of electromagnetic waves. First, control unit 6 outputs data to select the initial data, or terminal number 9 in this case, to analog switches 21 to 23 (sp1) to start signal generating unit 4, and outputs data to analog switch 24 (sp2), causing the signal generating unit to be selected. Next, control unit 6 transfers the digital data in RAM 41 in sequence to the DA converter 55 by supplying clocks and causes the converter to execute DA conversion to convert this digital data into a PAM signal (sp3).

Figures 8A, 8B:
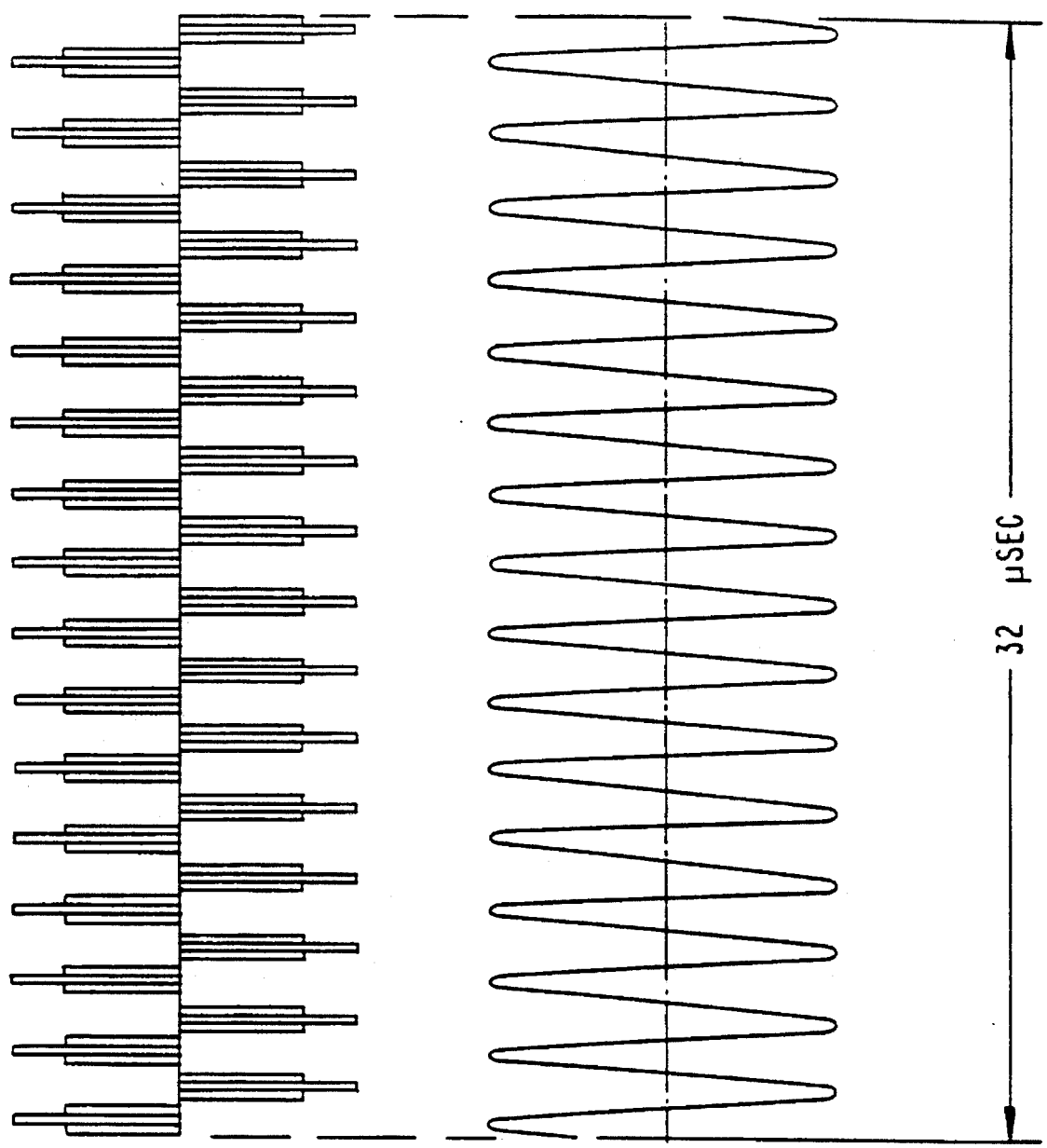
FIGS. 8 (a) and (b) are wave-form charts of a PAM signal and its envelope component in the signal generating unit of FIG. 1.

FIG. 8 (a) is an illustration of the PAM signal waveform that is output by the above DA converter at this time. This PAM signal is converted into an envelope component as shown in FIG. 8 (b), or a 500 kHz AC wave, by removing the high-frequency components through low pass filter 43 as previously described. Then, this signal is amplified to a proper level by driving amplifier 44 and output to switching unit 2.

The above PAM signal is actually a unipolar signal consisting of only a positive component and a negative component. In the drawing, the signal is represented as a bipolar signal to facilitate understanding. (The DC part is actually cut off by low pass filter 43 or driving amplifier 44 or a capacitor inserted between them which is not indicated in the drawing, with the result that the signal becomes a bipolar signal.)

The above AC signal passes through analog switch 24 and is supplied to loop coils $C_0$ in the sensing unit, selected by each of analog switches 21 to 23, namely, 11-0, 11-8 and 11-17. The signal is emitted as an electromagnetic wave.

At this time, when input pen 3 is held in an approximately upright state or an operational state, on sensing unit 1, this electromagnetic wave drives coil 352 of input pen 3 and causes tuning circuit 35 to Generate an induced voltage synchronized with the above AC signal.

On the other hand, when the above transmission period of 32 μsec terminates, control unit 6 activates signal generating unit 4 into a standby state and starts signal detecting unit 5, and outputs data to select this signal detecting unit side to analog switch 24 (sp4).

Figures 9A, 9B:
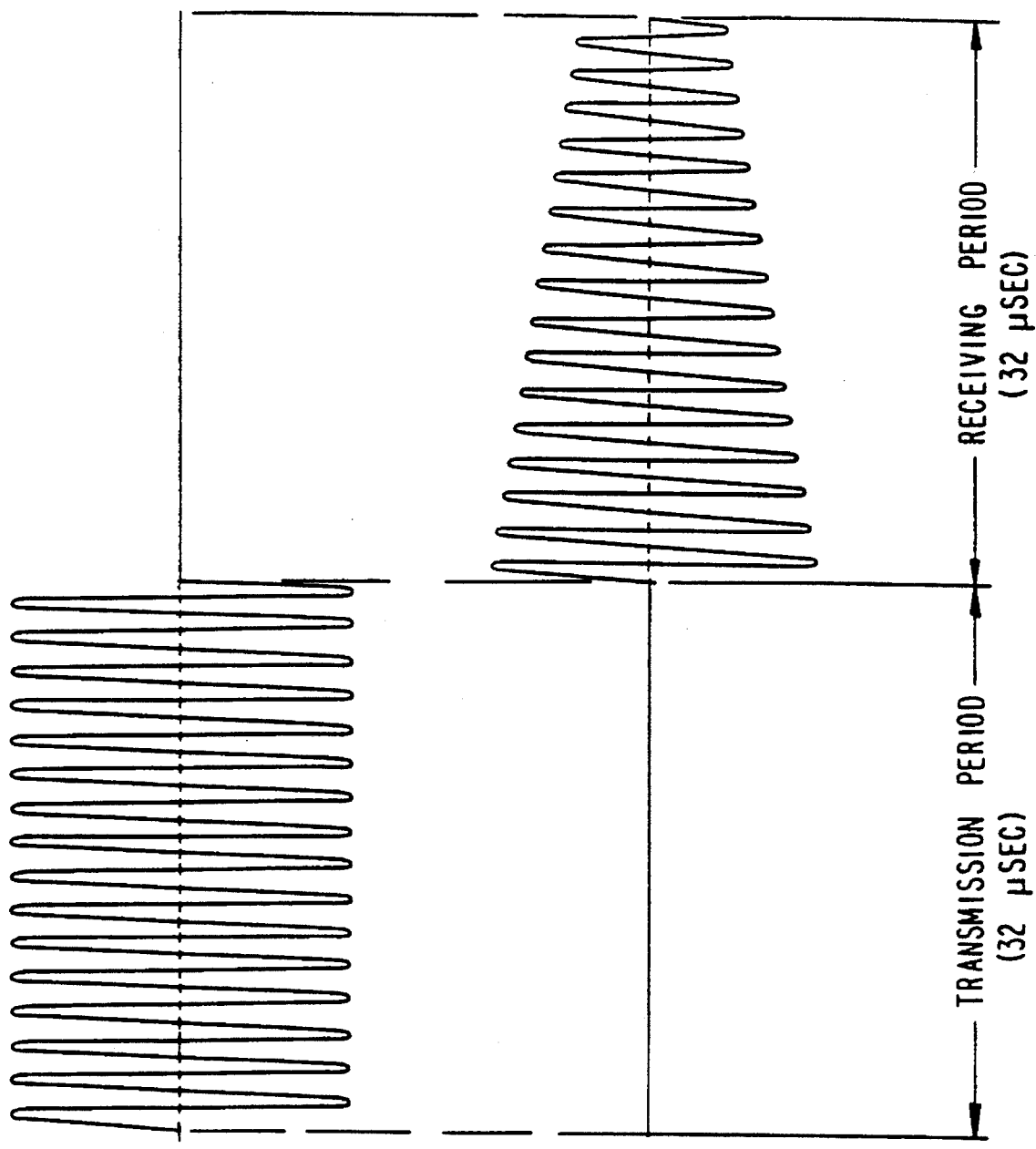
FIGS. 9 (a) and (b) are waveform charts that indicate an example of a transmitted signal and received signal of FIG. 1.

When analog switch 24 is switched, the electromagnetic wave from loop coils 11-0, 11-8 and 11-17 disappears immediately. However, the induced voltage generated in tuning circuit 35 of input pen 3 gradually decreases due to losses in the timing circuit. When coils 11-0, 11-8 and 11-7 are no longer energized, energy stored in circuit 35 causes coil 352 to emit an electromagnetic wave. This electromagnetic wave reverse-drives loop coils 11-0, 11-8 and 11-17 connected to signal detecting unit 5 through analog switch 24, so that induced voltage (received signal) due to the electromagnetic wave from coil 352 is generated in loop coils 11-0, 11-8 and 11-17. FIGS. 9 (a) and (b) are illustrations of exemplary transmitting signal and received signal waveforms in sensing unit 1.

The above received signal is amplified to a proper level by preamplifier 51, amplifiers 52 and 53 and attenuator 54 and then input into the AD converter 55.

After starting the signal detecting unit, control unit 6 supplies clock control to cause AD converter 55 to sample the received signal 128 times at intervals of 250 nsec to execute AD conversion and causes arithmetic circuit 56 to perform a discrete Fourier transform operation that will be described later (sp5), and outputs its result to processing unit 8 (sp6). The time (32 μsec) required to sample the above received signal 128 times at intervals of 250 nsec is called the receiving period.

Next, control unit 6 has the switching data for analog switches 21 to 23 updated into second data, or data to select terminal number "1" in this case, and has above steps sp1 to sp6 executed. After obtaining the results of calculations for loop coils $C_1$, namely, 11-1, 11-10 and 11-19, the control unit sends them out to processing unit 8. Thus, the switching data is updated up to the 8th data and the above operations are repeated (sp7 and sp8).

Regarding the amplitude out of the said calculation results, the values obtained by switching analog switches 21 to 23 vary with the X-direction positions of input pen 3.

Figure 10A:
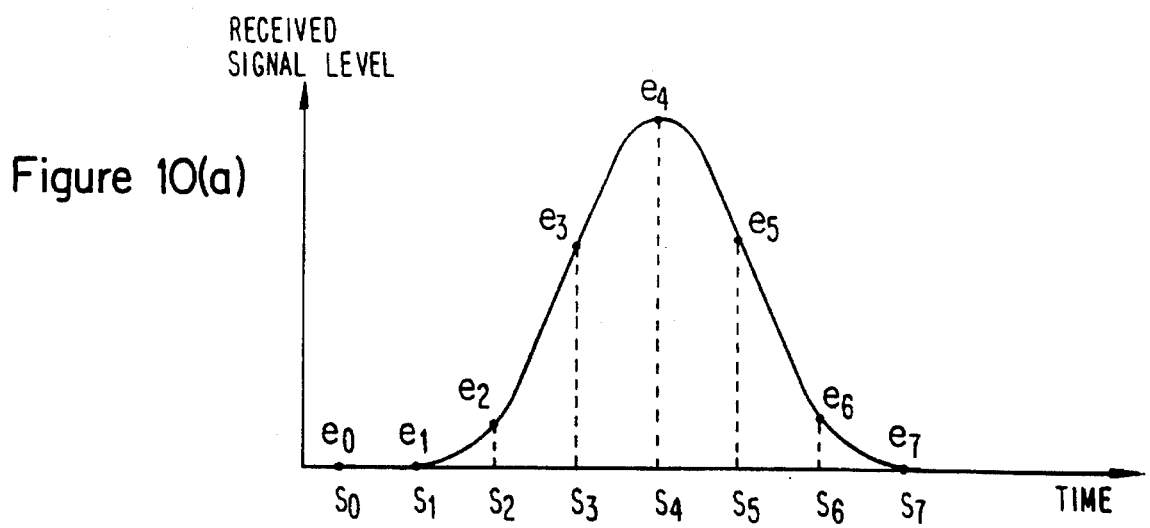
FIGS. 10 (a), (b) and (c) are diagrams showing changes in received signal when loop coils of FIG. 2 are switched in turn.
Figure 10B:
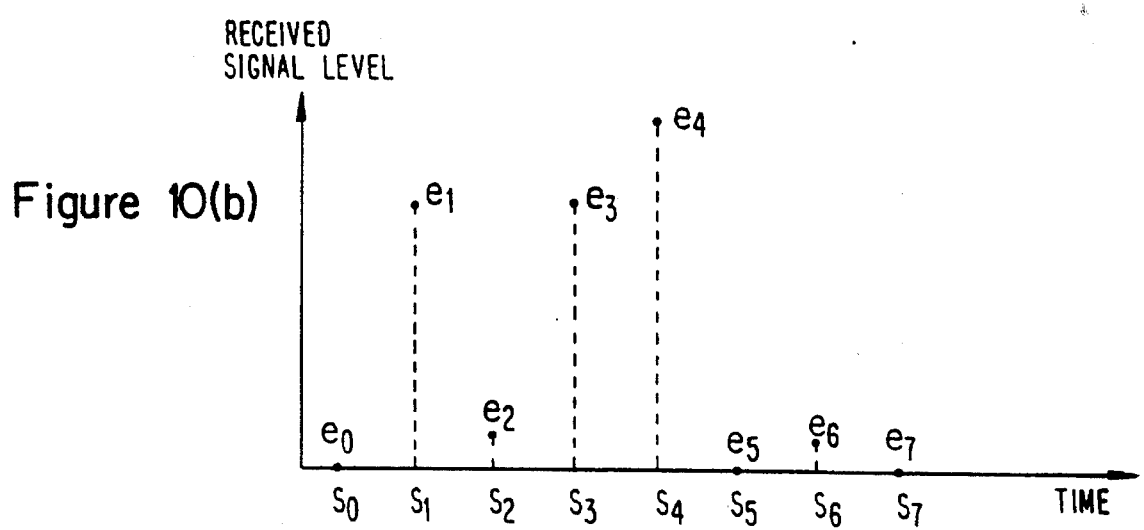
Figure 10C:
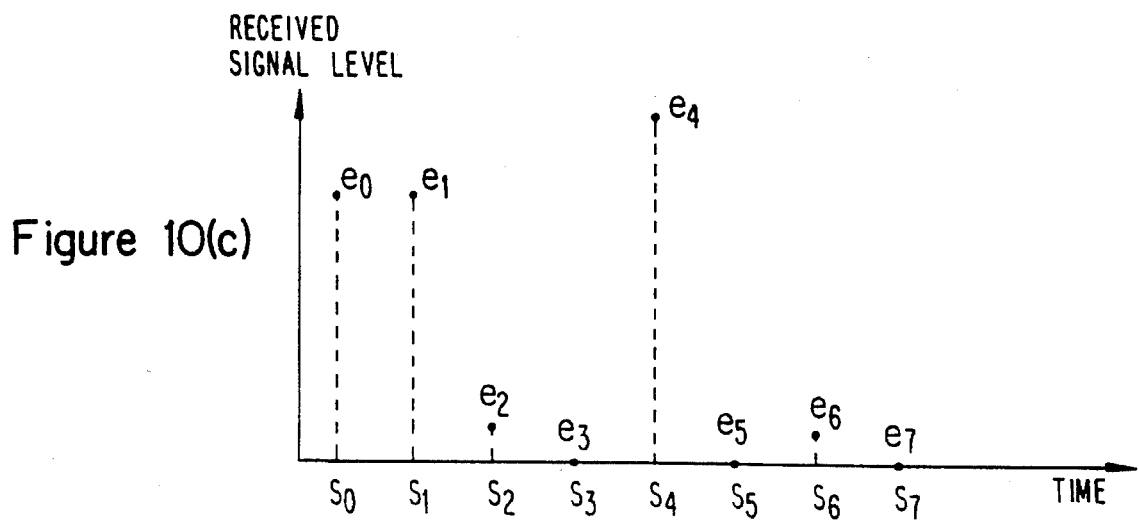

FIG. 10 (a) is a plot of an exemplary changes of the amplitude (level) of a received signal obtained by switching analog switches 21-23 when input pen 3 is at position A or loop coil 11-4 in FIG. 2. In the figure, $S_0$, $S_1$, $S_2$, $S_3$, $S_4$, $S_5$, $S_6$ and $S_7$ represent the times at which each of the selection terminals with terminals numbers "0, 1, 2, 3, 4, 5, 6, 7" are selected in analog switches 21 to 23, and $e_0$, $e_1$, $e_2$, $e_3$, $e_4$, $e_5$, $e_6$ and $e_7$ represent the levels corresponding to the above times. FIG. 10 (b) is the same type of drawing as FIG. 10 (a) when input pen 3 is at position B or loop coil 11-11 in FIG. 2. FIG. 10 (c) is the same type plot as FIG. 10 (a) when input pen 3 is at position C in loop coil 11-18 in FIG. 2.

Due to the said relative positional relation of each loop coil in sensing unit 1, the pattern of received signal level change in FIG.10 (b) or (c) is different from the case shown in FIG. 10 (a). This pattern differs with each loop coil on which input pen 3 is located and can be determined uniquely by it.

For example, when $e_4 > e_3 > e_5 > e_2$, or $e_4 > e_3 = e_5 > e_2$ (=$e_6$), or $e_4 > e_5 > e_3 > e_6$, input pen 3 is located on coil 11-4.

When $e_4 > e_1 > e_3 > e_2$, or $e_4 > e_1 = e_3 > e_2$ (=$e_6$), or $e_4 > e_3 > e_1 > e_6$, input pen 3 is located on loop coil 11-11.

When $e_4 > e_0 > e_1 > e_2$, or $e_4 > e_0 = e_1 > e_2$ (=$e_6$), or $e_4 > e_1 > e_0 > e_6$, input pen 3 is located on the loop coil 11-18.

Processing unit 8 pre-registers each pattern to be obtained when input pen 3 is located on each of loop coils 11-0 to 11-23, and identifies the nearest loop coil or the loop coil on which input pen 3 is located, by the pattern obtained as a result of the processing of above step S4 (S5).

Incidentally, in this device, the final coordinate values are calculated by an interpolation operation based on the received signal levels obtained from the nearest loop coil and the loop coils provided on both sides of it as described later. Therefore, it is desirable to obtain each received signal with the pattern (single peak response) shaped as shown in FIG. 10 (a). To attain this, it is sufficient to change the loop coil switching order according to the loop coil closest to input pen 3.

Figure 11A:
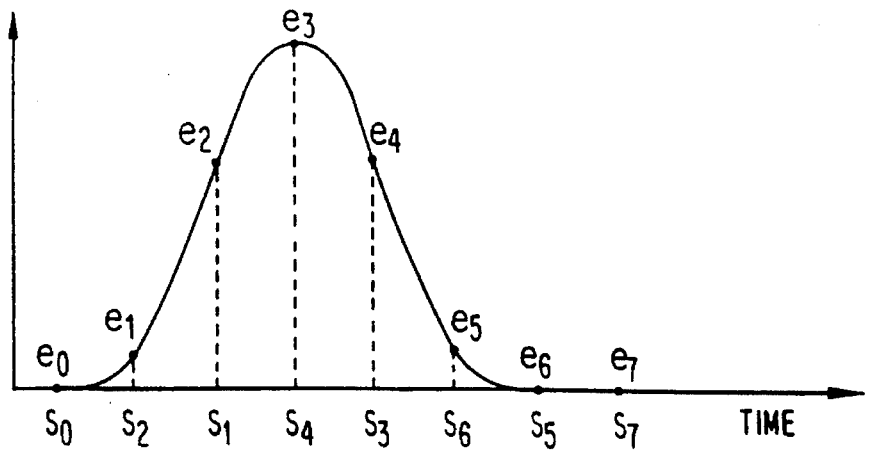
FIG. 11 (a) and (b) are diagrams of changes in signals received by the loop coils as a function of input pen position.
Figure 11B:
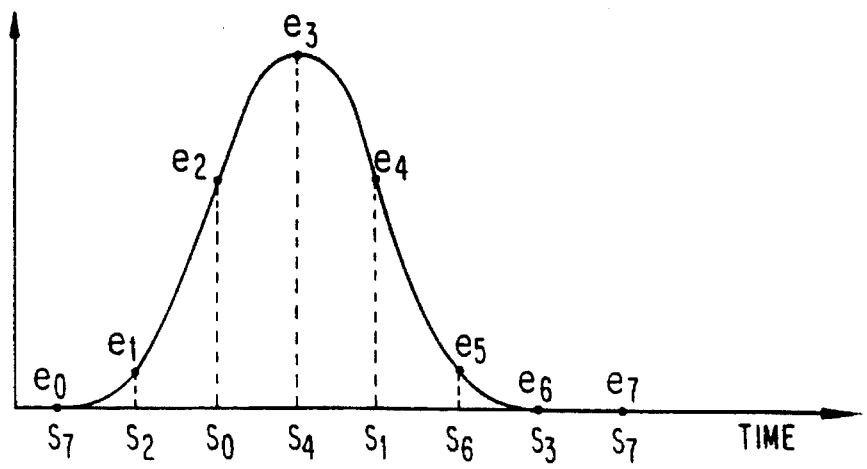

For example, when input pen 3 is located at position B, analog switches 21 to 23 are switched in the order of terminal numbers "0, 2, 1, 4, 3, 6, 5, 7", so that a received signal level with a single peak response such as shown in FIG. 11 (a) can be obtained. When input pen 3 is located at position C, analog switches 21 to 23 are switched in the order of terminal numbers "7, 2, 0, 4, 1, 6, 3, 7", so that such a received signal with a single peak response as shown in FIG. 11 (b) can be obtained.

Processing unit 8 pre-registers the analog switch switching orders that permit the said received signal level with a single peak response to be obtained for the case where input pen 3 is located on each of loop coils 11-0 to 11-23, and writes analog switch 21-23 switching data corresponding to the loop coil closest to input pen 3, obtained as a result of the processing of above step S5, into control unit 6 (S6), and causes control unit 6 to perform transmission/reception of electromagnetic waves in the same way as above step S4 (S7).

Processing unit 8 checks if the pattern of the received signal level obtained from the result of the processing of above step S7 has a single peak response (S8), and repeats the processing of S3 to S7 if it is not. If a single peak response is obtained, processing unit 8 calculates the coordinate value and phase information of the position specified by input pen 3 from the result obtained at that time as described later (S9), writes them onto interface unit 7 (S10), and transfers them to the host computer. After that, the processing of steps S6 to S10 is repeated.

Next, the discrete Fourier transform operation in arithmetic circuit 56 of signal detecting unit 5 and the result to be obtained thereby, are explained.

Supposing that the data sampled in a predetermined period (250 nsec in this case) and then converted into a digital value in the AD converter 55 is $v_i$ (i: sampling number), the transformation value $V_k$ corresponding to the frequency component, represented by the number k of waves in the receiving period, is represented as follows:

$$V_k = (1/N) \sum_{i=1}^{N} v_i e^{-j\{2\pi(i-1)K/N\}} \qquad (1)$$

Figure 12:
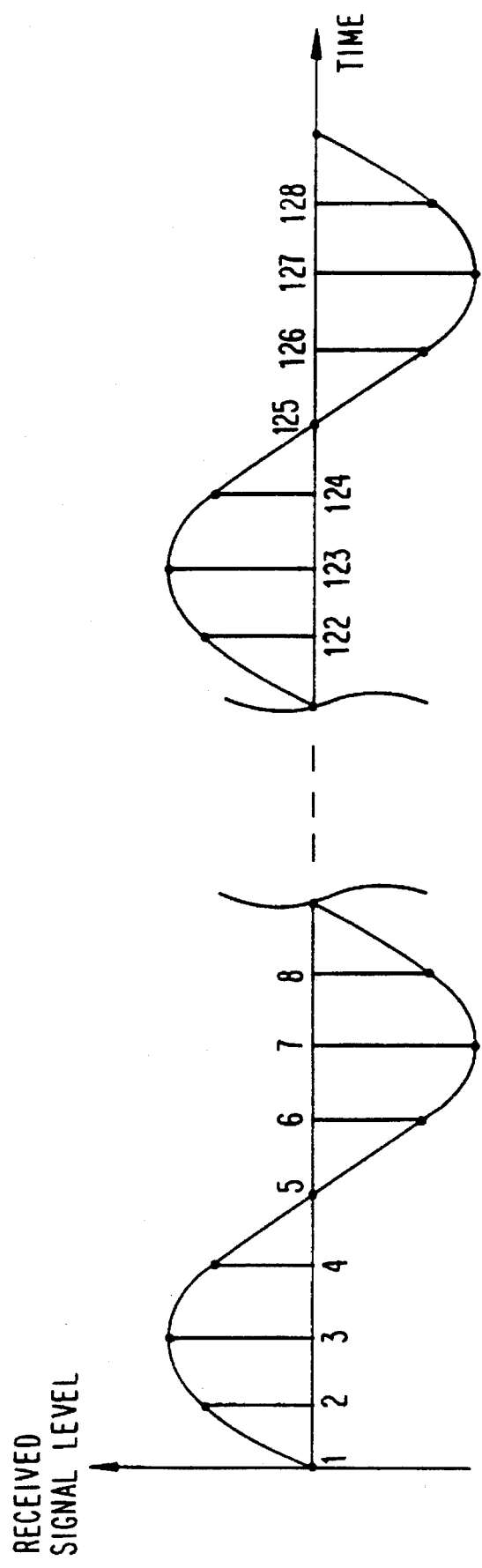
FIG. 12 is a drawing of the sampling number positions for a received signal.

In the above, N is the number of sampling times, e.g., 128 in a specific example to be considered. k is an integer 0–(N–1), namely, 0–127. Sampling number i is 1–128. The position for the received signal is shown in FIG. 12.

The wave period corresponding to $2\pi$ in the above expression (1) is 32 μsec, corresponding to 31.25 kHz. Accordingly, $V_k$ at k=0 represents the DC component. $V_k$ at k=1 represents the frequency component of 31.25 (kHz)×1= 31.25 kHz. $V_k$ at k=2 represents the frequency component of O 31.25 (kHz)×2=62.5 kHz. Thus, $V_k$ at k=16 represents the frequency component of 31.25 (kHz)×16=500 kHz.

Accordingly, by obtaining the k value corresponding to the frequency component of the transmitting signal or 500 kHz, namely, by obtaining $V_k$ at k=16, the received signal corresponding to the electromagnetic wave emitted from input pen 3 can be derived.

Now, complex number calculation can be represented as follows:

$$e^{-j\theta} = \cos\theta - j\sin\theta \qquad (2)$$

That is, as the real part is real ($e^{-j\theta}$)=cosθ and the imaginary part is image ($e^{-j\theta}$)=–sin θ, the real part in the above expression (1) is represented as:

$$A_k = (1/N) \sum_{i=1}^{N} V_i \cos\{2\pi(i-1)K/N\} \quad (3)$$

The imaginary part is represented as:

$$B_k = (1/N) \sum_{i=1}^{N} V_i \sin\{2\pi(i-1)K/N\} \quad (4)$$

Consequently, $$V_k = (A_k^2 + B_k^2)^{1/2} \quad (5)$$

Actually, the amplitude of the received signal can be obtained by calculating expressions (3), (4) and (5). The phase angle of the received signal can be obtained from:

$$\theta_k = \tan^{-1}(B_K/A_k) \quad (6)$$

If two or more frequency components are mixed in a transmitting signal and two or more input pens provided with a tuning circuit for these frequencies or an input pen provided with two or more tuning circuits for these frequencies is used as described later, it is sufficient to determine $V_k$ and $\theta_k$ of the k values corresponding to individual frequencies.

Next, the calculation of the coordinate value and phase information of a specified position in processing unit 8 is explained.

Figure 13A:
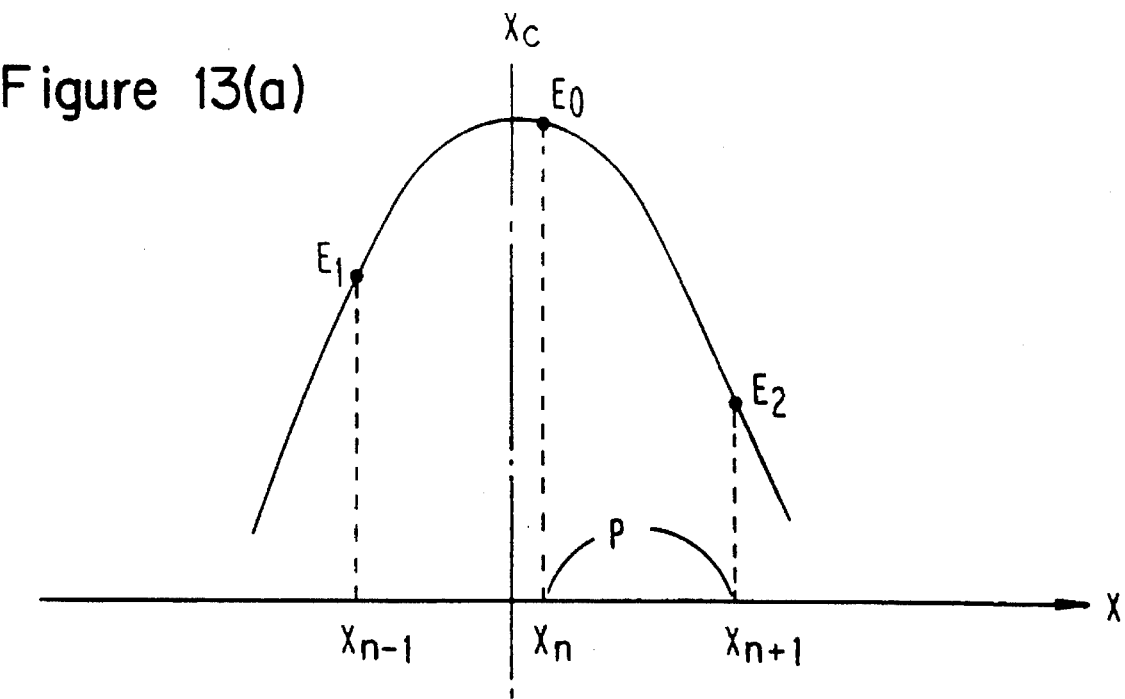
FIGS. 13 (a) and (b) are drawings of the positional relation between the input pen and loop coils.
Figure 13B:
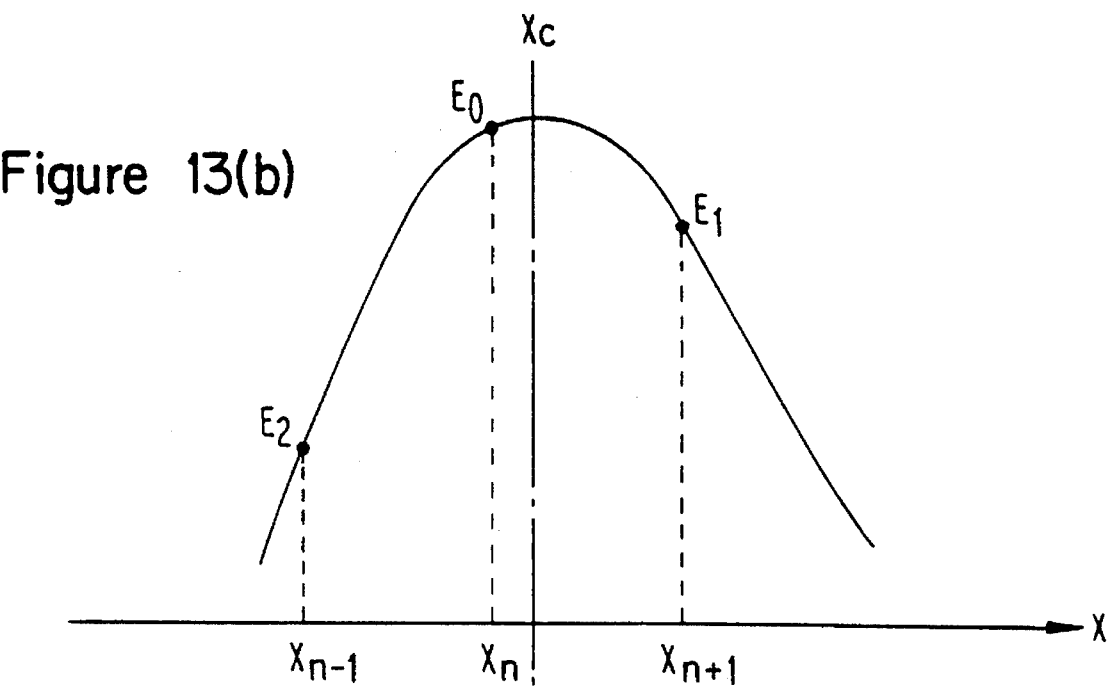

Supposing that the level of the received signal obtained from the loop coil closest to the position of input pen 3 is $E_0$ and the levels of the received signals obtained from the adjacent loop coils are $E_1$ and $E_2$ ($E_0 > E_1 > E_2$) and that the relation between position $X_c$ of input pen 3 and the position of each loop coil is as shown in FIG. 13 (a) or (b). In this case, $X_n$ is the center position of the loop coil with coil number n closest to input pen 3, $X_{n-1}$ is the center position of the loop coil with coil number (n−1), and $X_{n+1}$ is the center position of the loop coil with coil number (n+1). The above coil numbers mean the numbers in the case where loop coils are counted to the right, assuming that the far left loop coil is the first loop coil.

In the case of FIG. 13 (a), namely, where level $E_1$ corresponds to the (n−1)th loop coil, coordinate value $X_c$ of input pen 3 with $X_0$ (left end of loop coil 11-0) as the origin can be found by the following expression assuming that the pitch between loop coils is P.

$$X_c = (n-1)P + (E_0 - E_1)/(2E_0 - E_1 - E_2)P + P/2 \quad (7)$$

In the case of FIG. 13 (b), namely, where level $E_1$ corresponds to the (n+1)th loop coil, coordinate value $X_c$ can be found similarly by the following expression.

$$X_c = (n-1)P + (E_0 - E_2)/(2E_0 - E_1 - E_2)P + P/2 \quad (8)$$

Accordingly, processing unit 8 receives the indicated values $E_0$, $E_1$ and $E_2$ from the signal amplitude obtained by signal detecting unit 5, determines whether $E_1$ corresponds to the (n−1)th loop coil or the (n+1)th loop coil, and determines the coordinate value $X_c$ by performing the calculation of expression (7) or (8).

The phase information of the input pen signifies a difference in phase angle between the transmitting signal and received signal caused by a slight shift in the resonance frequency in tuning circuit 35. In this case, because the phase angle of the transmitting signal is set at 0°, the phase angle $\theta_k$ of the received signal determined by signal detecting unit 5 is used as it is.

Because the resonance frequency of tuning circuit 35 is changed when switch 351 of input pen 3 is turned on and off as previously described, the above phase information is also changed when switch 351 is turned on and off. Accordingly, the on and off state of above switch 351 are detected from changes in this phase information (for example, in the host computer). The on (or off) state of switch 351 is used as information to specify a value for actual input, out of the coordinate values of the specified positions, by input pen 3.

In the above embodiment, it is sufficient to switch the loop coils of the sensing unit 1 eight times from the start of measurement. So, the time required to first determine the position of input pen 3 can be greatly reduced. Generally, supposing that the number of groups in the said sensing unit is m, the time required is 1/m of the time for selecting all loop coils in sequence. In the above operational example, analog switches are provided in accordance with the loop coils in each group. However, loop coils to be simultaneously selected in each group may be connected before connection to the analog switch. In this case, the use of one analog switch is sufficient. In this case, nine wires, including grounding wire, between the sensing unit and the switching unit are sufficient. Thus, the sensing unit can be installed on a different board separately from the other parts, for example, on a film board on which parts cannot be soldered. This leads to cost reduction of the sensing unit.

In the above embodiment, the frequency, phase and amplitude of an electromagnetic wave to be generated from the loop coil can be freely set by the digital data to be written into RAM 41 of signal generating unit 4. Even when an electromagnetic wave of two or more frequencies is generated, an oscillator for each frequency is not required and the amplitude and phase angle for an optional frequency component can be calculated by applying a Fourier transform operation to a received signal by arithmetic circuit 56 of signal detecting unit 5. Accordingly, when an electromagnetic wave of two or more frequencies is generated, the amplitude and phase angle of each frequency can be precisely calculated. As no ceramic filter is required in contrast to the prior art, it is sufficient to perform the transmission/reception of electromagnetic waves only once for a loop coil. This greatly improves switching speed and permits complete design in IC format except the sensing unit, resulting in a cost reduction.

In the above embodiment, signal detecting unit 5 enters a standby state while an electromagnetic wave is transmitted, and signal generating unit 4 enters a standby state while an electromagnetic wave is received. This contributes to reduction in power consumption. In the above embodiment, the coordinate values of a specified position only in the X-direction or only in one direction is detected.

However, if another sensing unit similar to sensing unit 1 is juxtaposed in close vicinity at a right angle to sensing unit 1, and a switching unit similar to switching unit 2 is connected to it, a switching circuit is provided between these two switching units and between signal generating unit 4 and signal detecting unit 5, and a slight change occurs in the programs of control unit 6 and processing unit 8. The coordinate value of a specified position in both X and Y directions can thus be detected.

In the above embodiment, the configuration of sensing unit 1, switching unit 2 and the loop coil switching control based thereon, and signal processing by signal generation unit 4 and signal detecting unit 5 do not always need to be performed simultaneously. A standard sensing unit and switching unit may be combined with above signal generating unit 4 and signal detecting unit 5. Or, above sensing unit 1 and switching unit 2 and the loop coil switching control based thereon may be combined with an ordinary signal generating unit and signal detecting unit.

Figures 14A, 14B, 14C:
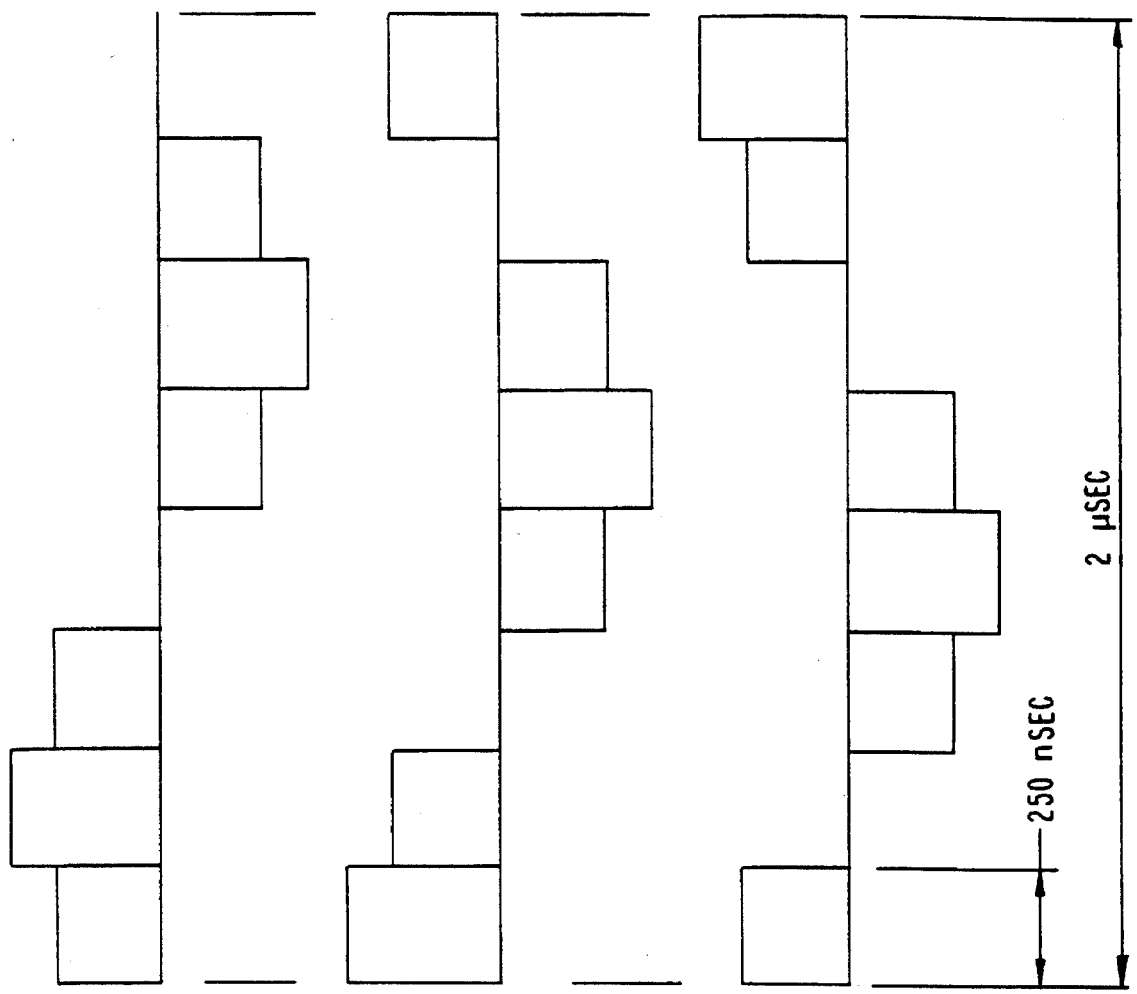
FIGS. 14 (a), (b) and (c) are waveform charts of a part of a PAM signal when the phase is shifted.

FIG. 14 is a diagram of part of the PAM signal derived from D converter 42 when the phase of the transmission signal is shifted; in FIG. 14 (a), the shift is 0°. FIG. 14 (b) is a diagram of the output signal with 45° phase. FIG. 14 (c) is the output signal with 90° phase. Because a large counter electromotive force is caused if a large current is suddenly connected to or disconnected from loop coils which may destroy electronic parts, a transmission signal with only one frequency component is never output with a phase other than 0°.

Figures 15A, 15B:
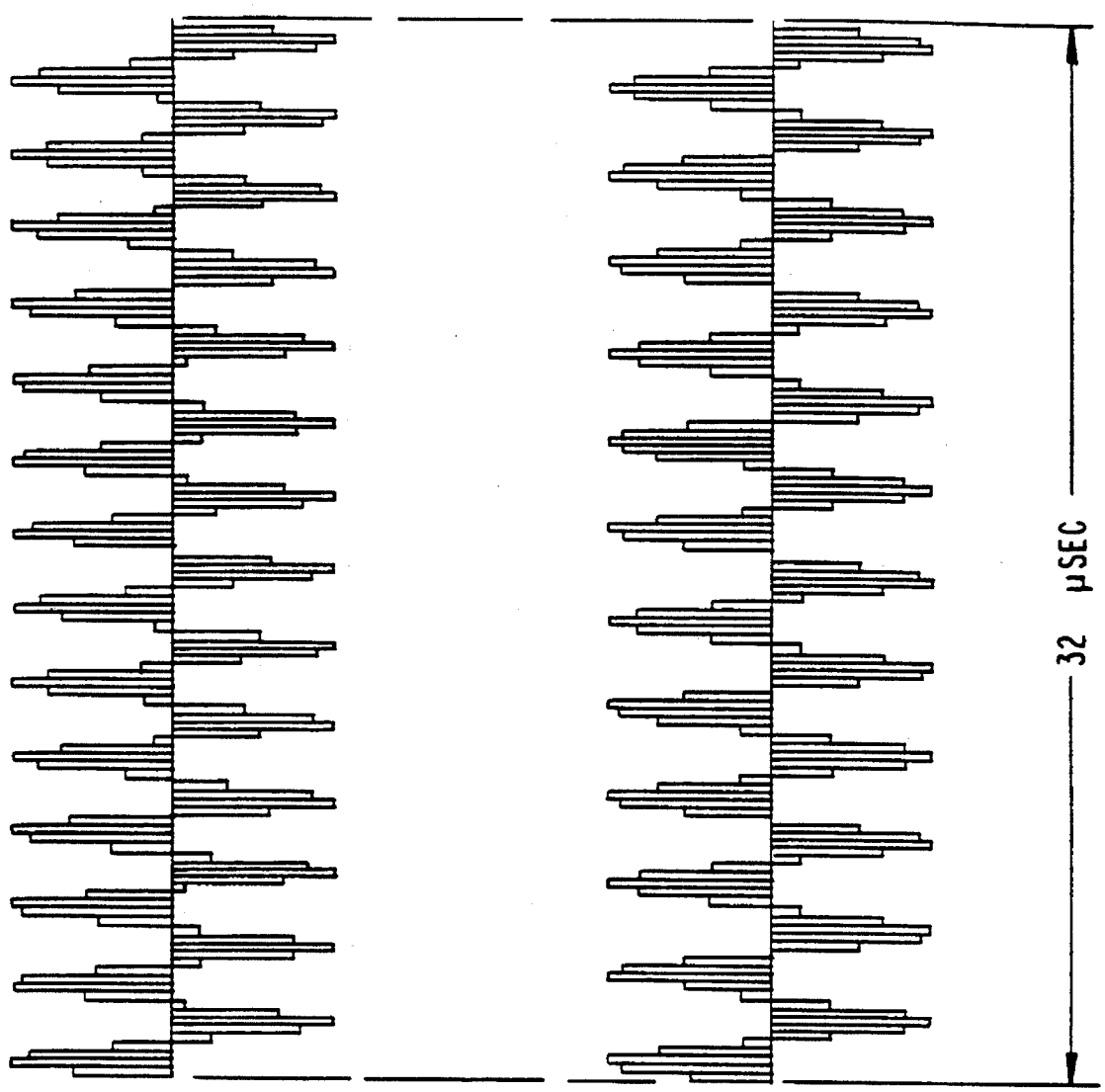
FIGS. 15 (a) and (b) are waveform charts of other examples of PAM signals.

FIG. 15 is a diagram of another example of the PAM output signal from DA converter 42. FIG. 15 (a) is a diagram of the signal corresponding to a transmission signal with a frequency of 437.5 kHz (14 waves in a 32 µsec transmission period) and FIG. 15 (b) is a diagram of the signal corresponding to a transmission signal with a frequency of 375 kHz (12 waves in a 32 µsec transmission period).

Figures 16A, 16B:
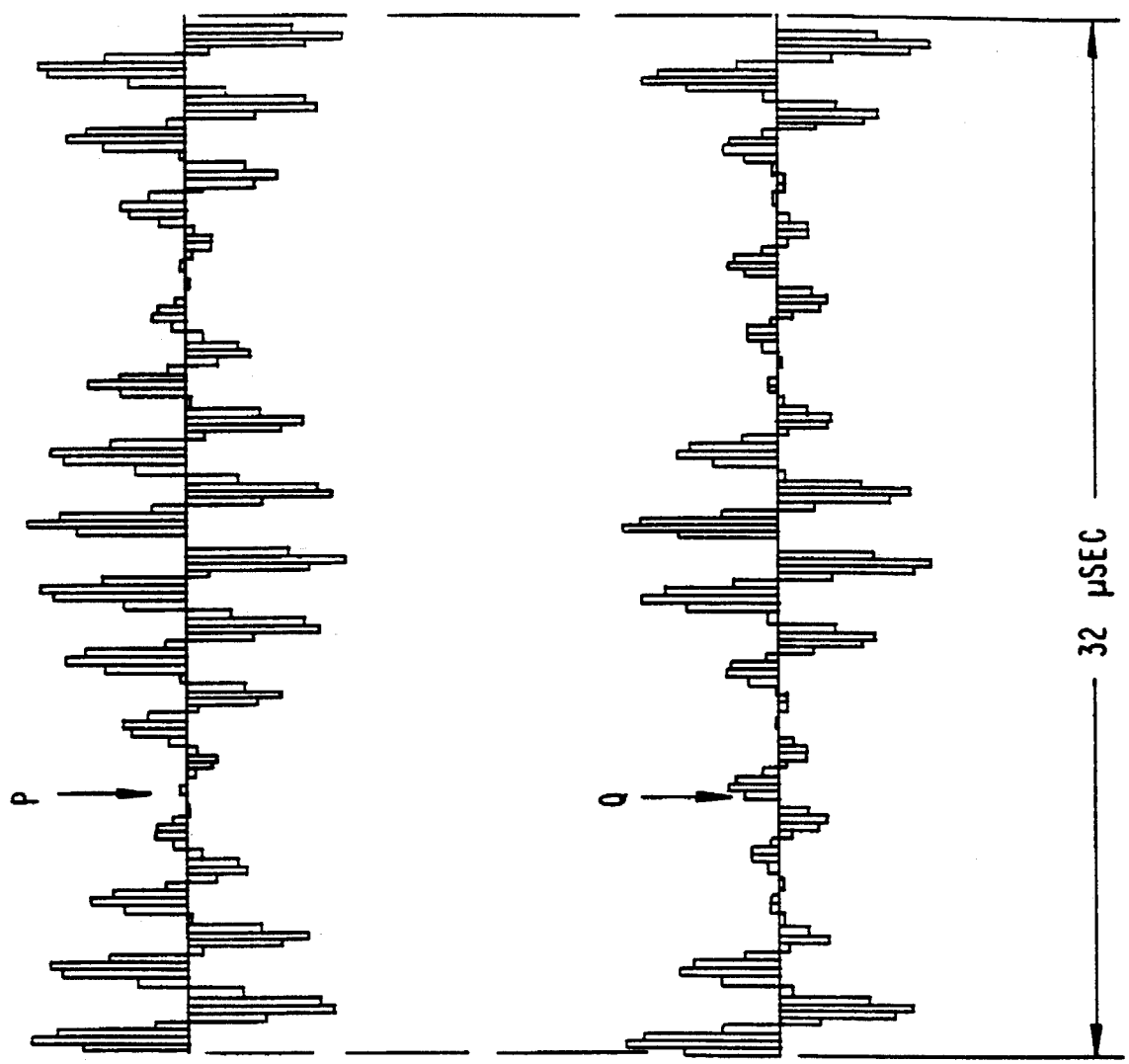
FIGS. 16 (a) and (b) are waveform charts of still further exemplary PAM signals.

FIG. 16 is a diagram of another example of a PAM output signal from the DA converter. FIG. 16 (a) is a diagram of a composite signal consisting of a transmission signal with a frequency of 500 kHz and a transmission signal with a frequency of 437.5 kHz, and FIG. 16 (b) is a diagram of a composite signal having three anharmonic components consisting of a 500 kHz transmission signal, a 437.5 kHz transmission signal and a 375 kHz transmission signal. All of the above signals are mixed to have a phase angle of 0° and an amplitude of ½ in FIG. 16 (a) and an amplitude of ⅓ in FIG. 16 (b). In this case, if the signal of FIG. 16 (a) or (b) is directly derived at a time corresponding to the beginning of the 32 µsec period, a large current is suddenly connected or disconnected as described before. For this reason, the signals of FIGS. 16 (a) and 16 (b) are actually derived from the position (P, Q in the figure) where there is a 0° phase angle therein, i.e., at a zero ampitude. (In this case, phase information is obtained for each frequency as the difference between the phase angle for positions P or Q and the phase angle of the received signal.) The signals, i.e., waveforms, of FIGS. 16 (a) and 16 (b) are therefore applied from the single output terminal of amplifier 44 to the coils of tablet 2 via switches 21–23 only when the waveforms have zero amplitude and the switches are activated between open and closed positions only when the waveform has a zero value.

In the above explanation, a new and improved device to determine the coordinate values of the specified position by sending electromagnetic waves back and forth between the loop coils of the sensing unit and position indicator including a tuning circuit has been described. However, this invention is applicable to any device if it determines the coordinate values of a specified position.

We claim:

1. A position detector for determining the coordinate values of a position specified by a position indicator using an electromagnetic effect between a sensing unit including plural groups of several loop coils juxtaposed in the direction of position detection, the position indicator having at least one coil, comprising a selection means for simultaneously selecting a loop coil from each of the plural groups including loop coils juxtaposed in sequence out of said several loop coils whereby the relative positions of selected coils are not identical or symmetrical in each group or between groups except those within a predetermined limit, and an identifying means for identifying the loop coil on which the position indicator is located in response to a pattern of signal amplitudes obtained by said loop coil selection means.

2. The detector of claim 1 further including a data generating means for generating digital data corresponding to a selected AC signal, a digital-analog conversion means for converting the digital data into an AC analog wave applied to the selection means, an analog-digital conversion means for converting a received signal from the position indicator into digital data while performing sampling within a predetermined period, and an arithmetic means for calculating the amplitude and phase angle for a selected frequency component in the received signal by performing a predetermined operation for this digital data.

3. A position detector according to claim 2 wherein said predetermined operation is a discrete Fourier transform operation.

4. In an apparatus for detecting the position of an implement including an electric circuit responsive to a wave including a magnetic component, the apparatus comprising N groups of multiple loop coils having elongated substantially parallel sides, the loop coils of group K being spatially arranged as 1, 2 . . . k . . . n, where N is an integer greater than 2, K is selectively each of 1 . . . N, and k is selectively each of 1, 2 . . . n, and means for simultaneously connecting one coil of each group to a common non-ground terminal, the coils of each group being connected in sequence to the common terminal, the one coil of at least one group having a value of k different from the one coil of the remaining groups simultaneously connected to the common terminal.

5. The apparatus of claim 4 wherein the value of k differs for all of the N coils.

6. The apparatus of claim 4 wherein the value of k differs for only one of the N coils connected to the common terminal.

7. The apparatus of claim 4 wherein the value of k differs for all of the coils for certain connections of the N coils connected to the common terminal and the value of k differs for only one of the N coils for two other connections of the coils connected to the common terminal.

8. The apparatus of claim 4 wherein the value of k differs for all of the coils for certain connections of the N coils connected to the common terminal and the value of k differs for only one of the N coils for at least one other connection of the coils connected to the common terminal.

9. The apparatus of claim 4 wherein the simultaneously connected coils are not identical or symmetrical in each group or between groups except those within a predetermined limit.

10. In an apparatus for detecting the position of an implement including an electric component comprising a source for supplying a single output terminal with an AC excitation waveform having plural simultaneously derived anharmonic frequency components, a tablet having multiple electric elements for electrically sensing the position of the implement, the elements being coupled to the single output terminal to be responsive to an output resulting from the waveform having plural simultaneously derived anharmonic frequency components, and a switch connected in a circuit between the single output terminal and the elements, the switch being activated between open and closed positions only when the waveform has a zero amplitude.

11. The apparatus of claim 10 further including processing means responsive to an interaction between the elements and the implement for indicating the implement position relative to the elements.

12. The apparatus of claim 10 wherein the source comprises a digital synthesizer or deriving the AC excitation waveform.

13. The apparatus of claim 12 wherein the synthesizer derives multibit digital data having values corresponding to the amplitude of the waveform.

14. The apparatus of claim 12 wherein the synthesizer includes a data generating means for generating multibit digital data having values corresponding to the amplitude of the AC wave, and further including digital-analog conversion means for converting the multibit digital data into an analog AC wave forming the AC excitation waveform, an analog-digital conversion means for converting a received signal from the tablet into digital data after sampling within a predetermined period, and an arithmetic means for calculating the amplitude and phase angle for a selected frequency component in the received signal by performing a predetermined operation for digital data.

15. The apparatus of claim 10 wherein each of the elements includes a loop coil.

16. In combination, an implement including an electric circuit responsive to a wave including a magnetic component, and apparatus for detecting the position of the implement, the apparatus comprising: N groups of multiple loop coils having elongated substantially parallel sides, the loop coils of group K being spatially arranged as 1, 2 . . . k . . . n, where N is an integer greater than 2, K is selectively each of 1 . . . N, and k is selectively each of 1, 2 . . . n, and means for simultaneously connecting one coil of each group to a common non-ground terminal, the coils of each group being connected in sequence to the common terminal, the one coil of at least one group having a value of k different from the one coil of the remaining groups simultaneously connected to the common terminal.

* * * * *